Sept. 27, 1955 A. SOSS 2,718,699
ELECTRICALLY OPERATED CLEAVER
Filed July 16, 1954 2 Sheets-Sheet 1
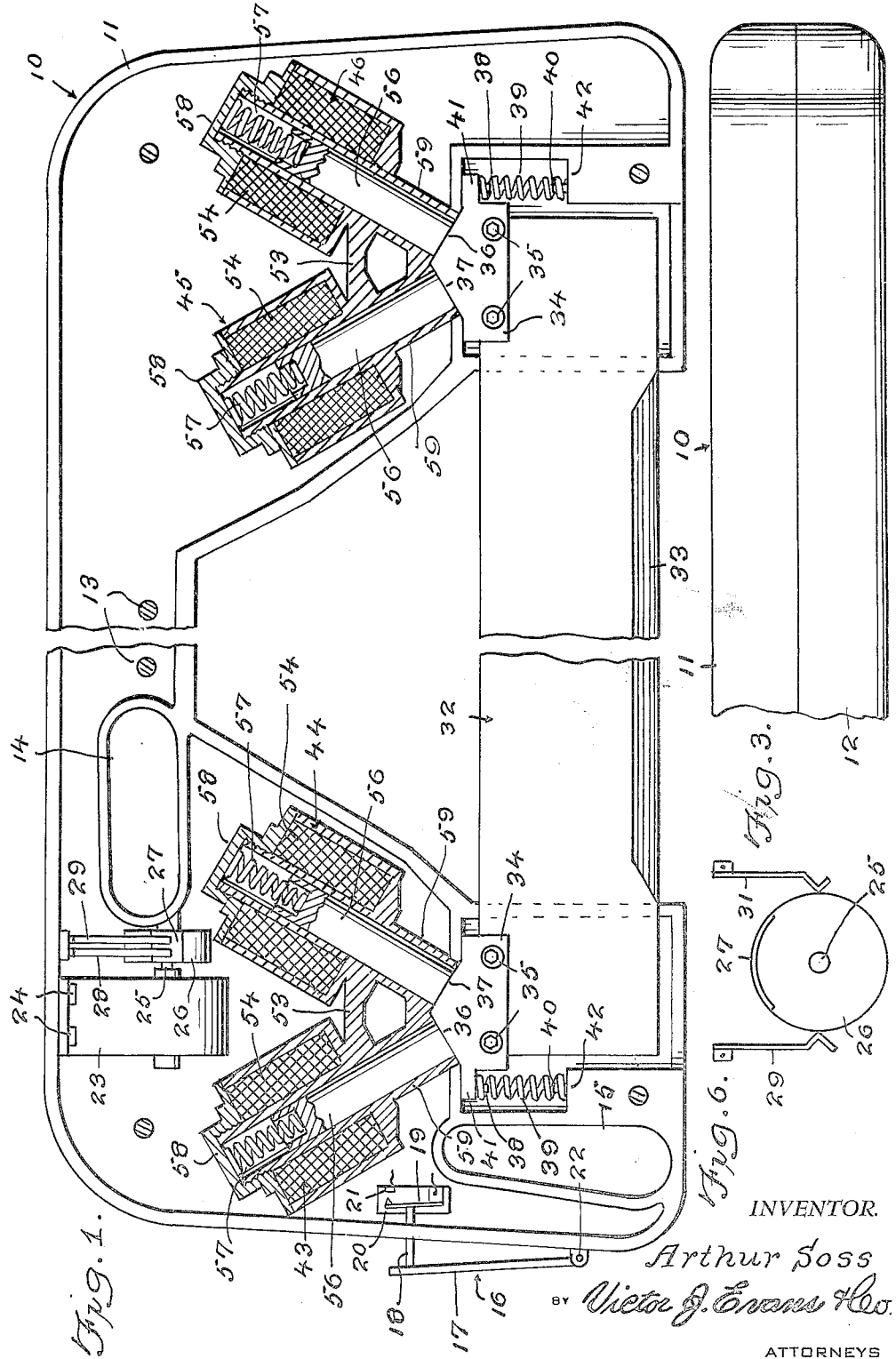
INVENTOR.
Arthur Soss
BY Victor J. Evans & Co.
ATTORNEYS Sept. 27, 1955    A. SOSS    2,718,699
ELECTRICALLY OPERATED CLEAVER
Filed July 16, 1954    2 Sheets-Sheet 2
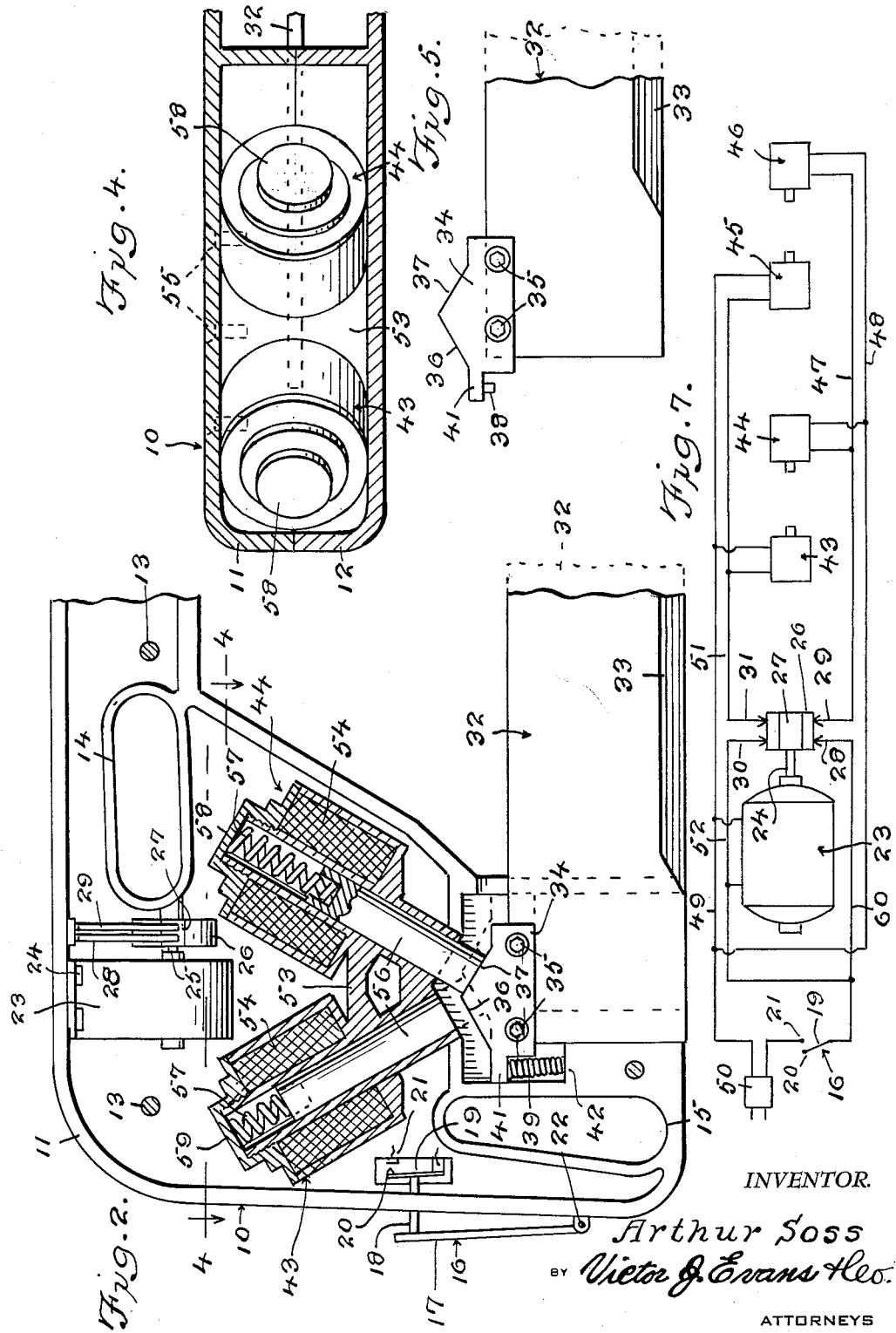
INVENTOR.
Arthur Soss
BY Victor J. Evans & Co.
ATTORNEYS

United States Patent Office 2,718,699
Patented Sept. 27, 1955

2,718,699

ELECTRICALLY OPERATED CLEAVER

Arthur Soss, McCook, Nebr.

Application July 16, 1954, Serial No. 443,729

1 Claim. (Cl. 30—272)

This invention relates to a cutter, and more particularly to an electrically operated cleaver.

This invention is an improvement over the cleaver shown and described in my co-pending application, Serial No. 349,842, filed April 20, 1953.

The object of the invention is to provide a cleaver which is constructed so that its cutting blade will be given a slicing as well as a shearing action.

Another object of the invention is to provide a cleaver which includes a housing that has a cutting blade movably mounted therein, there being solenoids and a motor mounted in the housing whereby the cutting blade will be given a longitudinal as well as a transverse movement to thereby produce a slicing as well as a shearing action.

Another object of the invention is to provide an electrically operated cleaver for cutting carcasses, meat and the like, wherein a plurality of solenoids are arranged in a housing, the solenoids being arranged in pairs and being arranged angularly with respect to each other and wherein a core is movably mounted in each solenoid, the cores adapted to engage a blade to alternately cause the blade to move in a direction parallel to the longitudinal axis of the blade as well as causing movement of the blade in a direction at right angles to the longitudinal axis of the blade so that a slicing action will be imparted to the cutting blade so that meat and the like can be cut with greater efficiency.

A further object of the invention is to provide a cleaver which will facilitate the cutting of foodstuffs and the like.

Other objects and advantages will be apparent during the course of the following description.

In the accompanying drawings, forming a part of this application, and in which like numerals are used to designate like parts throughout the same:

Figure 1 is a side elevational view of the cleaver, with one of the side sections or plates removed, and with parts broken away and in section, and showing the blade retracted.

Figure 2 is a fragmentary view similar to Figure 1, but showing the blade extended and to the left.

Figure 3 is a fragmentary top plan view of the cleaver.

Figure 4 is a sectional view taken on the line 4—4 of Figure 2.

Figure 5 is a fragmentary elevational view of the blade.

Figure 6 is an elevational view of the rotary drum and contacts.

Figure 7 is a schematic showing of the wiring diagram.

Referring in detail to the drawings, the numeral 10 designates a hollow housing which can be made of any suitable material, and the housing 10 includes a pair of casings or sections 11 and 12 which are detachably connected together by means of bolt and nut assemblies 13. The housing 10 is provided with openings 14 and 15 which define handles or hand grips so as to facilitate holding and using the cleaver.

There is also provided a manually operable switch 16 which includes a plate 17 that is hingedly connected to the housing 10 by means of a hinge pin 22, and the plate 17 carries a pin 18 which has a body member 19 secured to its inner end. The body member 19 is movable and carries a contact 20 that is mounted for movement into and out of engagement with a contact member 21 for a purpose to be later described, Figure 2.

Positioned within the housing is a motor 23 which is adapted to be connected to a suitable source of electrical energy, and the motor 23 may be secured in place by securing elements 24. A shaft 25 is operated by the motor 23, and a drum 26 is mounted on the shaft 25. The drum 26 may be made of a suitable insulating material such as plastic. Carried by the outer periphery of the drum 26 is a disc 27 which may be made of metal, and the drum has arranged in engagement therewith a plurality of contacts 28, 29, 30 and 31, Figure 7. The contacts 28 and 29 are arranged as a pair and are adapted to be selectively engaged by the metal segment 27, and similarly the other two contacts 30 and 31 are arranged as a pair and are adapted to be also engaged by the moving segment 27 as the drum 26 rotates.

Movably mounted in the housing 10 is a blade 32 which is provided with a cutting edge 33. Secured to each end of the blade 32 adjacent its upper surface is a tongue 34, the tongues 34 being secured to the blade 32 by suitable securing elements 35. Each tongue 34 is provided with a pair of angularly arranged inclined surfaces 36 and 37 for a purpose to be later described. A lip 41 projects outwardly from each tongue 34, and a guide pin 38 depends from each lip 41. A coil spring 39 has one end arranged in engagement with the guide pin 38, and the other end of each coil spring 39 engages a guide pin 40 which extends from a shoulder 42 that may be formed integral with the housing.

Referring to Figure 7 of the drawings there is shown a schematic wiring setup for the cleaver of the present invention, and it will be seen that there is provided four solenoids 43, 44, 45 and 46. These solenoids are positioned within the housing 10 as shown in Figure 1 and each may have the same construction. The solenoid 46 has a pair of wires or conductors 47 and 48 connected thereto, and the wire 47 leads to the contact 29, while the other wire 48 leads to a conductor 49 which is connected to a plug 50 which is adapted to be arranged in engagement with a suitable source of electrical energy. A wire 51 is also connected to the solenoid 45, and the wire 51 serves to connect the solenoid 45 to the contact 31 and to the solenoid 43. It will be seen that the circuit is arranged so that the motor 23 is connected to the wire 49 and to a wire 52, the wire 52 being also connected to the contact 30.

The wires 47 and 48 are also electrically connected to the solenoid 44 and the purpose of providing this arrangement is to insure that there will be imparted to the movable blade 32 a slicing action so as to facilitate cutting of meat and the like.

Each of the solenoids 43 through 46 has the same construction, and these solenoids are arranged in pairs and are connected to a pair of support members 53 which may be secured within the housing in their proper position by means of bolts 55. Each solenoid includes a coil 54 which has a movable core 56 mounted therein, there being a coil spring 57 interposed between an end of each core 56 and a cap 58. The cores 56 are slidably mounted in tubes 59 which have their lower ends open so that the cores 56 can slidably project therethrough and engage the inclined surfaces 36 and 37 of the tongues 34 to thereby cause a slicing action by the blade 32. A wire 60 leads from the contact 28 to the switch 16, Figure 7.

From the foregoing it is apparent that there has been provided an electrically operated cleaver wherein the cutting blade 32 will not only slice meat and the like but will also shear the meat. In use the cleaver may be connected to a suitable source of electrical energy by means of the plug 50, Figure 7. Then the cleaver may be gripped by inserting the fingers through the openings 14 and 15 and then when the switch 16 is manually depressed the circuit to the motor 23 will be completed and this will cause rotation of the shaft 25. As the shaft 25 rotates the drum 26 will rotate therewith so that the segment 27 will engage the contacts 28 and 29 simultaneously, and then move out of engagement with the contacts 28 and 29 and into engagement with the contacts 30 and 31. At times the segment 27 is out of engagement with all of the contacts 28 through 31 as for example when the drum 26 is in the position shown in Figure 6. This action results in alternate energization of the solenoids 43 through 46. Thus, when the segment 27 engages the contacts 28 and 29 the circuit to the solenoids 44 and 46 will be completed so that the cores 56 in these solenoids will be pulled up into the coils 54 to compress the coil springs 57. Then, when the segment 27 moves out of engagement with the contacts 28 and 29, the coils 44 and 46 will be de-energized whereby the coil springs 57 in these particular coils will force the cores 56 quickly out of the coils and into engagement with the inclined surfaces 36 or 37 on the tongues 34 to thereby force the blade 32 to the position shown in Figure 2 which is to the left and extended out of the housing. Then, as the drum 26 continues to rotate the segment 27 will move into engagement with the pair of contacts 30 and 31 to energize the pair of solenoids 43 and 45 so that the cores 56 in these solenoids will be pulled into the coils to compress their coil springs 57 and when the segment 27 moves beyond the contacts 30 and 31 the pressure of the coil springs 57 in the coils 43 and 45 will quickly force the respective cores into engagement with the inclined surfaces on the tongues 34 to move the blade 32 to the right and out of the housing in an extended position. When the coil springs 57 have expended their energy, the coil springs 39 will return the blade 32 from the position shown in Figure 2 back into the housing as shown in Figure 1. Thus, there will result an alternate extension and retraction of the blade 32 and at the same time the blade 32 will be moved from left to right so that there will be a cutting action by the cutting edge 33 which will result in more efficient cutting of the meat or carcass.

The solenoids 43 and 44 are arranged at 60 degree angles with respect to each other and similarly the solenoids 45 and 46 are arranged at 60 degree angles with respect to each other. These solenoids are timed so that their cores will strike alternate blows on the inclined surfaces of the tongues which are secured to the cutting blade 32 so that the blade 32 will be forced downward and to the right and left alternately to thereby produce a slicing as well as a shearing action on the cutting blade. The two left hand solenoids 43 and 45 are energized when the drum segment 27 comes under the switch contacts 30 and 31 so that the cores 56 are drawn back up into the center of the solenoids 43 and 45 thus compressing the coil springs 57. As soon as the segment 27 moves out of engagement with the contacts 30 and 31 the coil springs 57 in the solenoids 43 and 45 will cause the cores to drive the cutting blade 32 down and to the right into the workpiece.

The two right hand solenoids 44 and 46 operate similarly when the segment 27 engages the contacts 28 and 29 thereby energizing the solenoids 44 and 46 so that the cores in the solenoids 44 and 46 will be drawn up into the coils compressing the coil springs 57. Then when the segment 27 moves out of engagement with the contacts 28 and 29 the coil springs 57 in the solenoids 44 and 46 will cause the impactors or cores to force the blade to the left and down into the work. Thus, by having the four solenoids there will be imparted to the cutting blade a slicing (lateral) as well as a shearing (downward) action. This movement of the cutting blade will continue as long as the switch 16 is manually depressed.

I claim:

A cleaver comprising a hollow housing embodying a pair of casings detachably connected together, there being openings in said housing providing hand grips, a motor mounted in said housing and adapted to be connected to a source of electrical energy, a manually operable switch on said housing for controlling actuation of said motor, a shaft driven by said motor, a drum mounted on said shaft and made of insulating material, a metal segment carried by said drum, a plurality of contacts arranged in spaced apart relation with respect to each other and engaging said drum, a pair of support members secured within said housing, a pair of solenoids connected to each of said support members and electrically connected to said contacts, the solenoids of each pair being arranged angularly with respect to each other, the solenoids in one pair being arranged parallel to the solenoids in the other pair, a blade movably mounted in said housing and provided with a sharp cutting edge, a tongue secured to each end of said blade and provided with a pair of angularly arranged surfaces, a core slidably mounted in each of said solenoids for engagement with said angularly arranged surfaces of the tongues, whereby upon manual depression of said switch said motor is energized to rotate said shaft and drum so that the parallel solenoids of each pair are simultaneously actuated to cause the cores to strike the adjacent angular surfaces of the tongue and move the blade in the direction of movement of the cores, a coil spring arranged in engagement with each of said cores and positioned centrally of said solenoids, a lip extending outwardly from each of said tongues, and a coil spring having an end arranged in engagement with each of said lips and its other end abutting a stationary shoulder in said housing.

References Cited in the file of this patent
UNITED STATES PATENTS

| | | |
|---|---|---|
| 839,043 | Sherry | Dec. 18, 1906 |
| 922,795 | Meeker et al. | May 25, 1909 |
| 998,564 | Bonsall | July 18, 1911 |
| 1,383,977 | Bowman | July 5, 1921 |
| 1,541,334 | Dremel | June 9, 1925 |
| 2,080,200 | Demosky et al. | May 11, 1937 |
| 2,312,043 | Margin | Feb. 23, 1943 |
| 2,320,784 | Livingston et al. | June 1, 1943 |